US012589620B1

(12) United States Patent      (10) Patent No.:      US 12,589,620 B1

Board et al.                        (45) Date of Patent:          Mar. 31, 2026

(54) GOLF CART TOW LINK

(71) Applicant: PGA TOUR Enterprises, LLC, Ponte Vedra Beach, FL (US)

(72) Inventors: Adam Board, Ponte Vedra Beach, FL (US); Scott Black, Ponte Vedra Beach, FL (US); Ashley Sutton, Ponte Vedra Beach, FL (US); Wesley Angel, Ponte Vedra Beach, FL (US)

(73) Assignee: PGA TOUR Enterprises, LLC, Ponte Vedra Beach, FL (US)

( * ) Notice: Subject to any disclaimer, the term of this patent is extended or adjusted under 35 U.S.C. 154(b) by 0 days.

(21) Appl. No.: 19/087,160

(22) Filed: Mar. 21, 2025

(51) Int. Cl.
| | |
|---|---|
| *B60D 1/145* | (2006.01) |
| *B60D 1/30* | (2006.01) |
| *B60D 1/52* | (2006.01) |
| *B62D 7/16* | (2006.01) |
| *B60D 1/00* | (2006.01) |

(52) U.S. Cl.
CPC .............. *B60D 1/145* (2013.01); *B60D 1/30* (2013.01); *B60D 1/52* (2013.01); *B62D 7/16* (2013.01); *B60D 2001/005* (2013.01)

(58) Field of Classification Search
CPC . B60D 1/145; B60D 1/30; B60D 1/52; B60D 2001/005; B62D 7/16
USPC ....................................................... 280/503
See application file for complete search history.

(56) References Cited

U.S. PATENT DOCUMENTS

| | | | | |
|---|---|---|---|---|
| 5,226,657 A | * | 7/1993 | Dolphin | .................... B60D 1/40 |
| | | | | 280/498 |
| 5,788,255 A | * | 8/1998 | Hayes | ...................... B60D 1/00 |
| | | | | 280/493 |

| | | | | |
|---|---|---|---|---|
| 5,857,692 A | * | 1/1999 | Hayes | .................... B60D 1/143 |
| | | | | 280/410 |
| 6,158,759 A | | 12/2000 | Perry | |
| 7,510,204 B2 | * | 3/2009 | Inoue | ...................... B60D 1/00 |
| | | | | 280/491.3 |
| 12,103,620 B1 | | 10/2024 | Finn | |

(Continued)

FOREIGN PATENT DOCUMENTS

DE          19637228 C1      4/1998

OTHER PUBLICATIONS

International Search Report issued Jul. 23, 2025 in connection with PCT Application No. PCT/US25/20994.

(Continued)

*Primary Examiner* — Valentin Neacsu

*Assistant Examiner* — Michael R Stabley

(74) *Attorney, Agent, or Firm* — Blank Rome

(57)                    ABSTRACT

A modular tow link for linking two golf carts includes a bracket assembly including a tow bracket, towed bracket, and bar link. The tow bracket mounts to a front tow hitch of a tow cart, the towed bracket mounts to a front tow hitch of a towed cart, and the bar link couples between the tow bracket and towed bracket to couple the same. The bar link may be vertically pivotable and laterally restrained at the respective bar couplings. The tow link may also include a steering lock including a steer bar having a first end and a second end configured to couple between the towed bracket and a steering control link of the towed cart to lock a front wheel orientation of the towed cart relative to the towed bracket. The steer bar may be provided with a selectively adjustable length.

13 Claims, 10 Drawing Sheets

(56) References Cited

U.S. PATENT DOCUMENTS

2006/0232043 A1* 10/2006 Inoue ....................... B60D 1/54
                                                        280/515
2017/0043822 A1*  2/2017 Gray ................... B62D 13/025
2020/0391561 A1  12/2020 Chance
2023/0166571 A1*  6/2023 Robinson ............... B60D 1/565
                                                        280/494

OTHER PUBLICATIONS

Written Opinion of the International Search Authority issued Jul. 23, 2025 in connection with PCT Application No. PCT/US25/20994.

* cited by examiner

GOLF CART TOW LINK

TECHNOLOGY

The present application is directed to apparatuses and methods of linking golf carts. More specifically, the present application is directed to apparatuses and methods of linking frontends of a tow cart and towed cart and employing the tow cart to conduct push/pull towing operations with respect to the towed cart.

SUMMARY

In one aspect, a golf cart tow link for linking a tow cart and a towed cart includes a tow bracket, towed bracket, bar link, and steering lock. The tow bracket includes a body and is configured to couple to a front tow hitch of a tow cart. The towed bracket comprises a body and is configured to couple to a front tow hitch of a towed cart. The bar link includes a tow bracket end configured to couple to a bar coupling of the tow bracket and a towed bracket end configured to couple to a bar coupling of the towed bracket. The steering lock includes a steer bar having a first end configured to couple to the towed bracket and a second end configured to couple to a steering control link of the towed cart to lock a front wheel orientation of the towed cart relative to the towed bracket.

In one example, the body of the tow bracket includes a hitch mount configured to receive the front tow hitch of the tow cart therein. The hitch mount may include a hitch coupling including an opening for receiving a coupling member that further extends through an opening in the front tow hitch of the tow cart to couple the hitch mount and front tow hitch of the tow cart. The hitch slot may include an upper side and a lower side. The opening may include an opening in the upper side and an opening in the lower side.

In the above or another example, the tow bracket, towed bracket, or both may include a vertical stabilizer configured to extend below a front axle of the respective tow cart or towed cart to stabilize a vertical position of the respective tow bracket or towed bracket when coupled to the front tow hitch of the respective tow cart or towed cart. In one configuration, the vertical stabilizer includes one of more plates that extend parallel to a major plane of the body of the respective tow bracket or towed bracket.

In any of the above examples or another example, the tow bracket, towed bracket, or both may include a lateral stabilizer configured to stabilize a lateral angular position of the respective tow bracket or towed bracket when coupled to the front tow hitch of the respective tow cart or towed cart and that is further configured to position flush against a front axle of the respective tow cart or towed cart when coupled to the front tow hitch thereof. In one configuration, the lateral stabilizer includes one of more plates that extend parallel to a major plane of the body.

In any of the above of another example, the towed bracket includes a steering lock mount including a steering lock coupling configured to couple to a steering lock mount coupling positioned along the first end of the steer bar to couple the steering lock mount to the first end of the steer bar. The steering lock mount coupling may include a bushing that slidably mounts around the steering lock coupling to couple thereto. The steering lock coupling may include a shaft. In one configuration the bushing has upper and lower ends that slidably mount over the shaft such that an upper end of the shaft extends beyond first and second ends of the bushing. In a further configuration, the steering lock mount may extend vertically upwards from the body of the towed bracket from a riser to the steering lock mount coupling. The steering lock mount may include a shoulder between the riser and the steering lock mount coupling. A lower end of the bushing may seat on the shoulder when mounted on the steering lock coupling.

In any of the above or another example, the second end of the steer bar includes a steering control link coupling configured to couple to the steering control link of the towed cart. The steering control link coupling may include a shaft configured to extend through a slot in the steering control link of the towed cart. The steering control link coupling may include a clevis pin. The clevis pin may include a channel for receiving a cotter pin to retain the steering control link coupling within the slot of the steering control link when extended therethrough.

In any of the above or another example, the steer bar may be configured with an adjustable length to selectively adjust an operative length of the steer bar between the first and second ends. In one configuration, at least the first end or the second end comprises a threaded shaft rotatable relative to a threaded connection along the steer bar to increase and decrease a length the threaded shaft extends from the threaded connection.

In any of the above or another example, the steer bar may be configured with an adjustable length to selectively adjust an operative length of the steer bar between the first and second ends. The steer bar may include a turnbuckle assembly including a coupling having a first side and a second side, a first threaded shaft threadably coupled to the first side of the coupling by a first threaded connection, and a second threaded shaft threadably coupled to the second side of the coupling by a second threaded connection. In one configuration, the first end of the steer bar comprises the first threaded shaft and the second end of the steer bar comprises the second threaded shaft. The first threaded shaft and the first threaded connection may have a first thread handedness, and the second threaded shaft and the second threaded connection have a second thread handedness that is opposite of the first thread handedness.

In any of the above or another example, the bar link may include an opening at the tow end, towed end, or both configured to receive a coupling member comprising pin to couple to the bar link of the respected tow bracket or towed bracket. The opening may include a larger longitudinal length than width.

In any of the above or another example, the bar link may be configured to pivotably couple to at least one of the tow bracket or towed bracket and be vertically pivotable thereto and restrained from pivoting laterally.

In any of the above or another example, the bar coupling of the tow bracket, towed bracket or both may include a link bracket including a first plate and a second plate that together define a channel for receiving the respective tow end or towed end of the bar link. The first plate and second plate may include an opening configured to align with an opening in the respective tow end or towed end of the bar link when received within the channel and that receive a pin through the aligned openings to pivotably couple the respective tow end or towed end of the bar link.

In one configuration, when pivotably coupled, the respective tow end or towed end of the bar link may be vertically pivotable on the pin and laterally restrained between the first and second plates.

In another aspect, a modular tow link for linking a tow cart and a towed cart includes a bracket assembly including a tow bracket configured to pivotably couple to a tow bracket end of a bar link about a horizontally extending pin and a towed bracket configured to pivotably couple to tow bracket end of a bar link about a horizontally extending pin. The modular tow link may further include a steering lock including a steer bar having a first end and a second end and configured to couple between the towed bracket and a steering control link of the towed cart to lock a front wheel orientation of the towed cart relative to the towed bracket.

In one example, the tow bracket and towed bracket are configured to couple to front tow hitches of a respective tow cart and towed cart.

BACKGROUND

Golf carts may be stored or transported in storage bays. The storage bays, particularly storage bays of trailers, provide limited space for delivery and retrieval of the carts. Accordingly, driving carts in and out of these and other tight tolerance spaces can be extremely hazardous. As an example, typical retrieval of carts from within storage bays of trailers requires technicians to maneuver themselves between the frame of the trailer to access the storage bay carts. The technicians must then either further maneuver themselves to access the brake lock on a stored cart and manually pull the cart out of the storage bay or further maneuver themselves into the seat of a cart in order to drive the cart out of the storage bay. As similar situation plays out in reverse delivering carts into the storage bay. As it is sometimes preferable to store or transport carts facing the storage bay entrance, delivery may require backing carts into the extremely limited space within the storage bay. What is needed are apparatuses and methods that enable highly precise maneuvering of carts into and out of tight confines.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIGS. 2A-2D illustrate various views of a tow bracket of a tow link according to various embodiments described herein, wherein FIG. 2A is a perspective view, FIG. 2B is a top view, FIG. 2C is a side view, and FIG. 2D is a rear view;

FIGS. 3A-3D illustrate various views of a towed bracket of a tow link according to various embodiments described herein, wherein FIG. 3A is a perspective view, FIG. 3B is a top view, FIG. 3C is a side view, and FIG. 3D is a rear view;

FIGS. 4A and 4B illustrate a steering lock of a tow link according to various embodiments described herein wherein FIG. 4A is a perspective view and FIG. 4B is a side view in partial cross-section along plane 4B-4B of FIG. 4A;

DESCRIPTION

Figure 1:
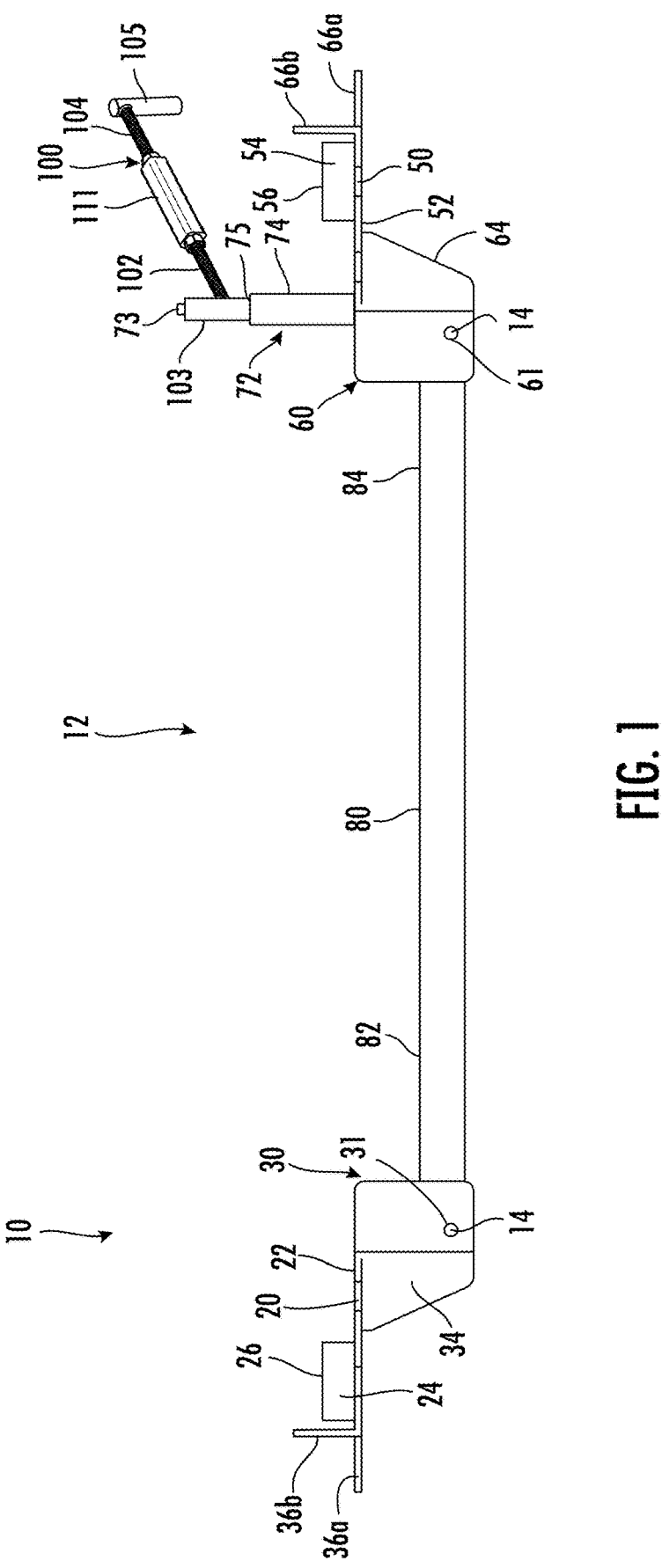
FIG. 1 illustrates a tow link according to various embodiments described herein.
Figure 2A:
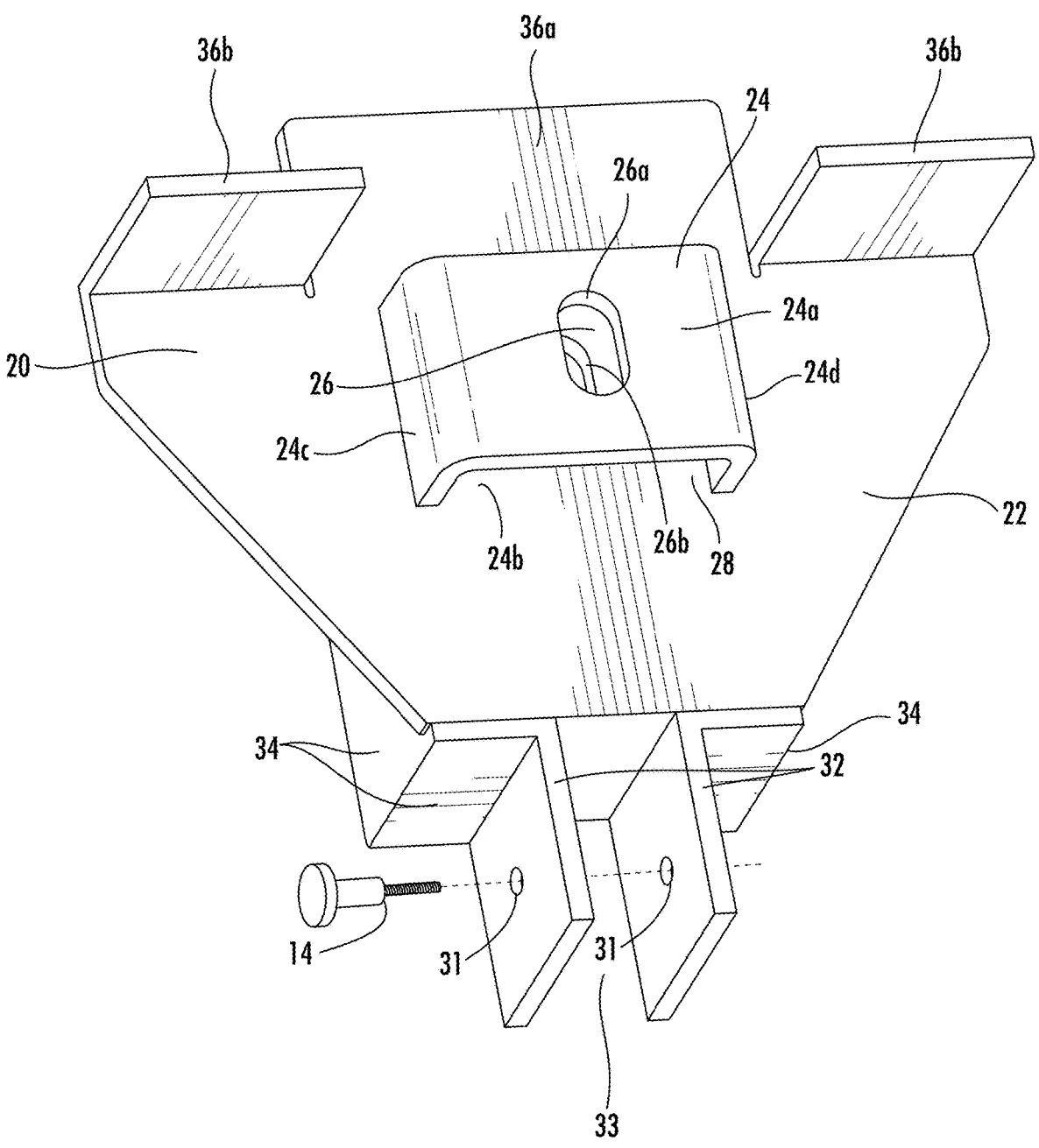
Figure 2B:
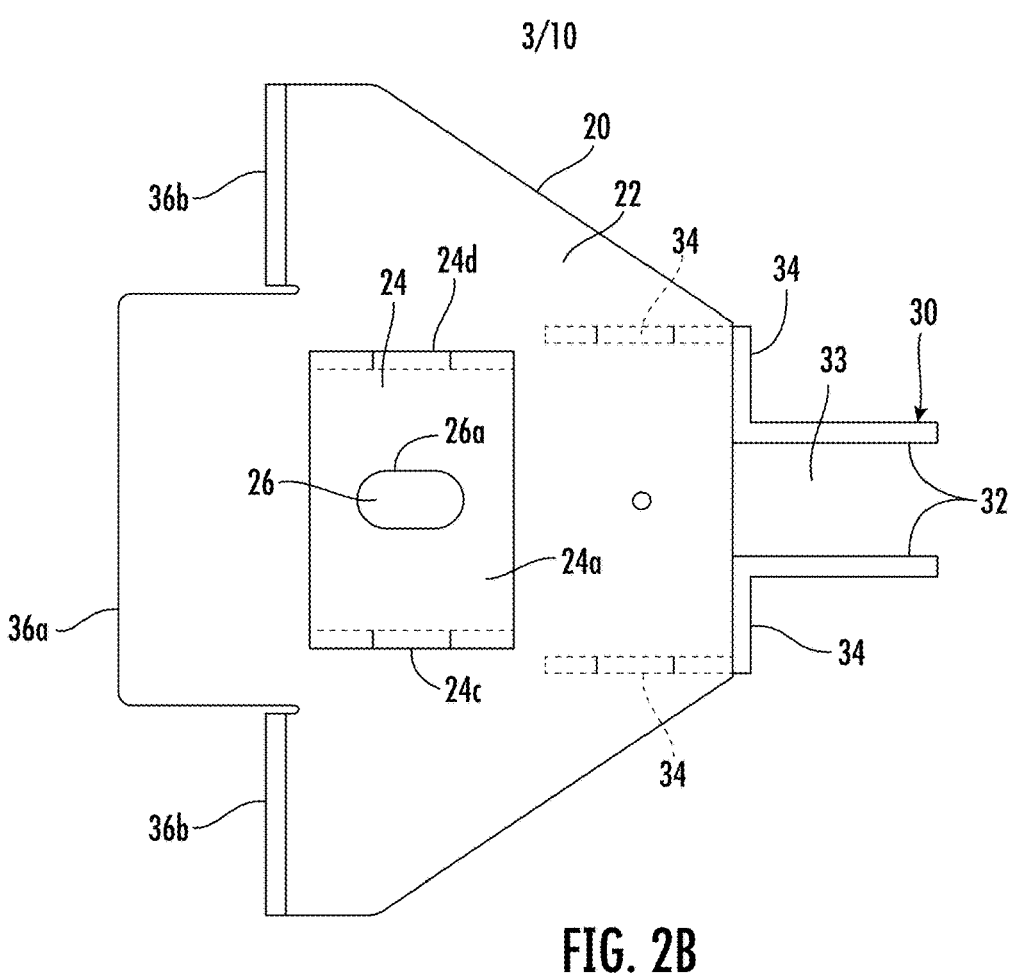
Figure 2C:
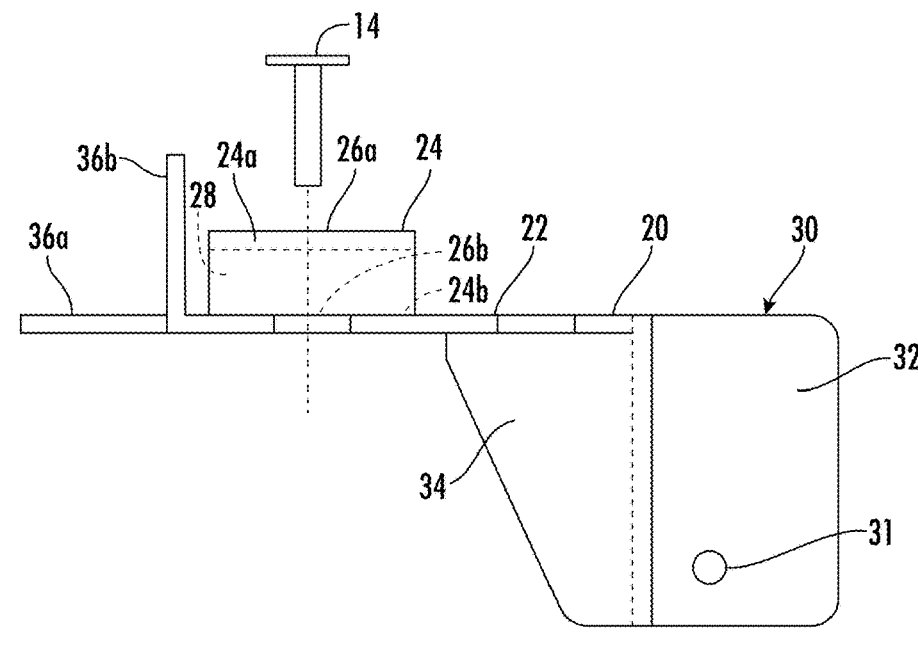
Figure 2D:
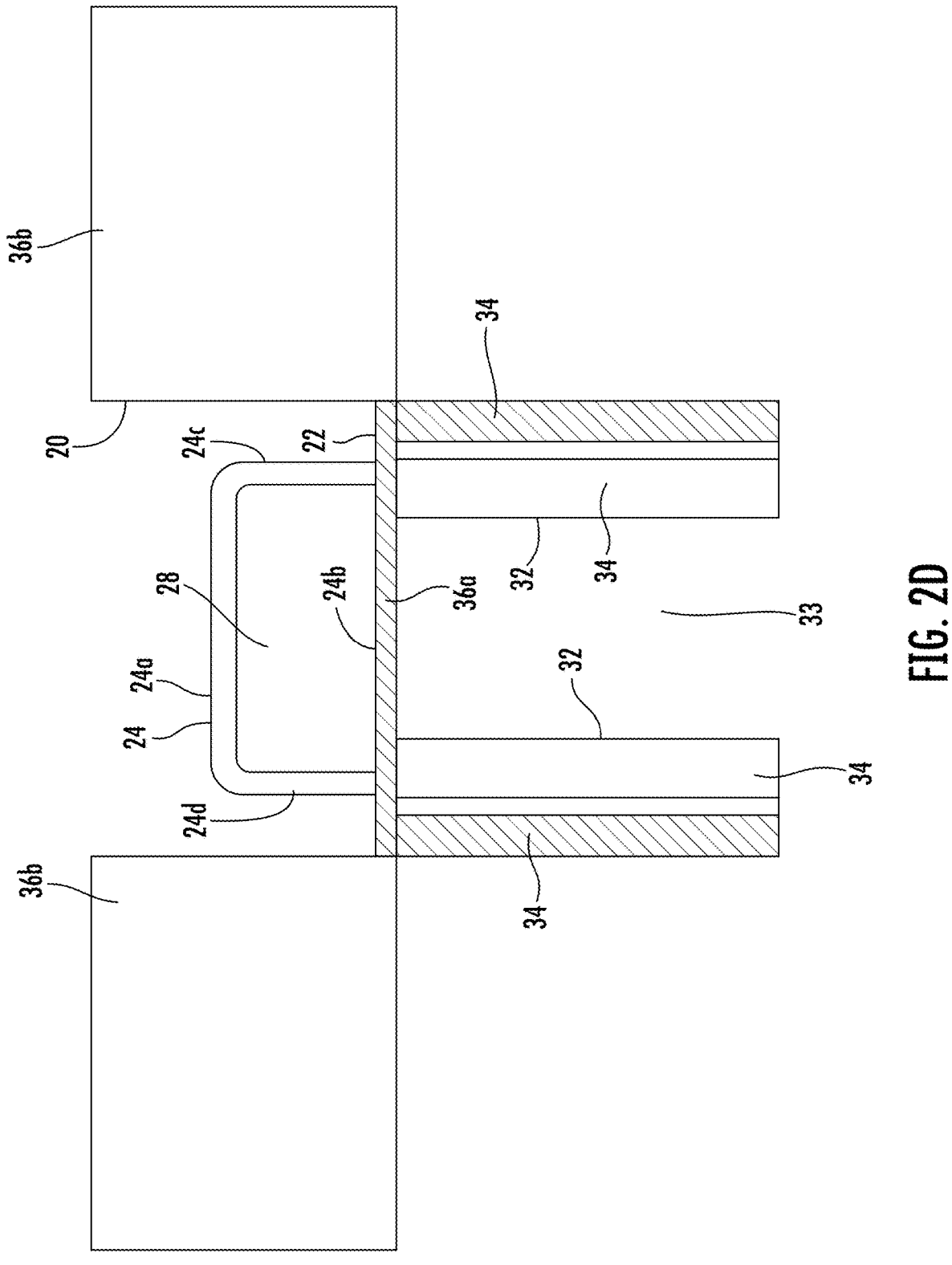

The present description describes various embodiments of a tow link and methods of linking and towing golf carts using a tow link. The tow link may be configured to link a pair of carts to enable a tow cart to push or pull a towed cart. The tow link may find beneficial use in porting carts, particularly EZ-GO® and Club Car® golf carts, between locations. For instance, various embodiments of the tow link may be deployed in short distance towing and pushing operation. In one example, the tow link may be utilized in cart delivery and retrieval from tight confines such as storage bays of trailers to enable highly precise maneuvering of towed carts. In various embodiments, the tow link in configured in a portable and modular assembly for quick and simple linking carts without the hassle of requiring use of tools.

Various features of a tow link 10 are described herein with exemplary reference to the drawings provided in FIGS. 1-5 wherein like numbers identify like features. Throughout the description, numbering is provided with respect to various features to assist the reader in ease of understanding the inventive concepts. That is, numbering is intended to direct the reader to one or more illustrated examples of the numbered features provided in the drawings. However, it is to be appreciated that the illustrated features are provided as examples and are not intended to be limiting with respect to the various forms the tow link 10 and its features described herein may take.

With particular reference to FIG. 1, a tow link for pulling or pushing a golf cart, which may be referred to as a towed cart herein, with another golf cart, which may be referred to as a tow cart herein, may include a bracket assembly 12 configured to couple between the tow cart and the towed cart. The bracket assembly 12 may include a pair of brackets 20, 50 configured to couple to tow hitches 120 (an example of which is provided in FIG. 6) provided on the carts. The brackets 20, 50 may each include a body 22, 52 including a hitch mount 24, 54 to mount to respective tow hitches 120. Hitch mounts 24, 54 may include hitch couplings 26, 56 configured to assist in coupling the hitch mounts 24, 54 to the tow hitches 120. Example, hitch couplings 26, 56 may include hooks configured to hook tow hitches 120, clamps configured to clamp tow hitches 120, or other suitable structures to assist in coupling to tow hitches 120. In one embodiment, a hitch mount 24, 54 may include a hitch coupling 26, 56 configured to receive a coupling member 14 to couple the bracket 20, 50 to a tow hitch 120 via the hitch mount 24, 54. For instance, a hitch coupling 26, 56 may include one or more openings 26a, 26b (see, e.g., FIG. 2A) through which a coupling member 14 such as a pin may be inserted to further extend through a tow hitch slot to couple the bracket 20, 50 to the tow hitch 120. Hitch mounts 24, 54 of a bracket assembly 12 may include a same or different configuration of hitch couplings 26, 56. In a preferred embodiment, brackets 20, 50 are configured to couple to frontend tow hitches 120 such that tow/push operations utilizing the tow link 10 may be performed while the frontends of the carts are oriented toward each other. Frontend tow hitches 120 generally include a tab or other extension on or near the front axel or frame of the cart that defines a slot that may be used to couple a towing implement. While the bracket assembly 12 is generally described herein as mounting to a slotted tow hitch 120, those having skill in the art will appreciate that brackets 20, 50 may similarly be configured to couple to other tow hitches 120.

The bracket assembly 12 may include a bar link 80 that couples between the brackets 20, 50 to structurally link the same. When the brackets 20, 50 are coupled to the carts, coupling the bar link 80 between the brackets 20, 50 links the carts via the bracket assembly 12. The bar link 80 may include a first bracket end 82 configured to couple to a bar link mount 30 of a tow bracket 20 and a second bracket end 84 configured to couple to a bar link mount 60 of a towed bracket 50. The bar link 80 may couple to the brackets 20, 50 via any suitable coupling mechanism, such as via hooks, latches, slots and pins, threaded connections, interference fit, among others. Specific examples may include clevis hooks or latched hooks that secure around a complementary structure such as one defining a slot or other structure around which a clevis hook or latched hook may hook. The particular coupling structures provided on a corresponding first bracket end 82 and bar link mount 30, such as those described herein, may be interchangeable, e.g., reversed, such that either may be configured with one side of a coupling mechanism while the other is configured with the other side of the coupling mechanism or vice versa. This interchangeability may similarly apply to the second bracket end 84 and bar link mount 60. FIG. 1 provides an example of a coupling mechanism comprising openings 31, 61 in the bar link mount 30, 60 and complementary openings 81, 83 (more clearing exemplified in FIG. 5) in the respective first bracket end 82 and second bracket end 84 configured to receive a coupling member 14, such as a pin, to secure the bar link 80 to the brackets 20, 60. In various embodiments, the coupling mechanism employed by one or both of the bar link mounts 30, 60 and respective first bracket end 82 and second bracket end 84 comprises a pivotable connection. The pivot may be vertical, horizontal, or universal, for example. In the illustrated example, the pivot is vertical about the coupling member 14.

Figure 6:
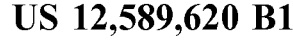
FIG. 6 illustrates a towed bracket and steering lock coupled to a tow hitch and steering control link of a towed cart according to various embodiments described herein.

In various embodiments, the tow link 10 may include or be configured to implement a steering lock 100 configured to lock the steering of the towed cart. For example, the steering lock 100 may lock the steering relative to the towed bracket 50. The steering lock 100 may include a steer bar 101 comprising a first end 102 and a second end 104. In one embodiment, the first end 102 is configured with a steering lock mount coupling 103 configured to couple to a steering lock mount 72 at a steering lock coupling 73. The steering lock mount 72 may be provided on a frame or axle of the cart that the wheels of the cart turn relative to when steered. In the illustrated embodiment, the towed bracket 50 is fitted with a steering lock mount 72 to which the steering lock mount coupling 103 is configured mount to the towed bracket 50. The second end 104 of the steer bar 101 includes a steering control link coupling 105 configured to couple to a steering control link 126 (an example of which is shown in FIG. 6) provided on the towed cart through which the steering may be controlled. For instance, certain carts often include steering control links 126 attached to the steering knuckle for coupling tow bars to tow the carts. These steering control links 126 may include an opening, shaft, or other coupling structure. The steering control link coupling 105 may comprise a coupling structure, such as a hook, clamp, slot, or pin, configured to assist in coupling the steering control link coupling 105 to the steering control link 126 and, hence, the operative movement of the steering knuckle, thereby enabling steering control from the connection.

As introduced above, various configurations of steering lock mount couplings 103 and steering control link couplings 105 may be used, such as any coupling structures suitable to connect the respective ends 102, 104 to the steering lock mount 72 and steering control link 126. The steering lock coupling 73, steering lock mount coupling 103, steering control link coupling 105, and steering control link 126 may include various coupling structures known in the art. The steering lock coupling 73, steering lock mount coupling 103, and steering control link coupling 105 may be configured with corresponding compatible coupling structures for coupling as described herein. Example coupling structures may include slots, clamps, hooks, shafts, or other suitable coupling structures. In one example, coupling structures may include mateable fittings, such as threaded fittings. In some embodiments, the steering lock 100, towed bracket 50, or both are configured for quick mounting, requiring little to no tools. For example, a steering control link 126 provided on the towed cart may include a coupling structure comprising a shaft or a slot. The steering control link coupling 105 may include a complementary coupling structure comprising a slot configured to receive the shaft or a shaft configured to receive the slot of the steering control link 126. The slot may include a sleeve or bushing, which may be open or closed end. The connection between the shaft and slot may be retained via suitable mechanisms such as gravity, interference fit, mechanical stress (e.g., tension or compression), a locking structure, such as a pin that extends through a channel in the shaft or otherwise blocks removal of the shaft from the slot. As another example, a steering lock mount 72 may include a steering lock coupling 73 comprising a coupling structure including a shaft or slot. The steering lock mount coupling 103 may comprise a coupling structure such as a slot, which may be as described above, configured to receive the shaft or a shaft configured to be slotted into the slot to couple the steer bar 101 to the steering lock mount 72. The slot and shaft connection may be retained via a suitable mechanism, such as those described above with respect to the steering controller coupling 105 and steering control link 126.

In one example, the steering control link coupling 105 includes a shaft configured to be received within a slot provided by the steering control link 126. For instance, the shaft may comprise a clevis pin. In one such configuration, the shaft may include a channel for receiving a pin, such as a cotter pin, for securing the shaft within the slot. In some embodiments, the slot may include a channel through which the pin may be inserted, or the shaft may extend through the slot such that the channel positions beyond the slot and the pin prevents the shaft from being pulled from the slot. In one embodiment, the steer bar 101 may be pivotably coupled to the towed bracket 50, steering control link 126, or both to provide flexibility in coupling and decoupling. In one example, a fixed distance provided by the mounting of the steer bar 101 may prevent or limit pivoting during push/pull towing operations.

In various embodiments, the steer bar 101 may be configured with a selectively adjustable length. The adjustable length may be used to allow customization of the direction of the wheels by controlling a distance between attachment points at the first and second ends 102, 104 of the steer bar 101. The adjustable length may include predefined settings, e.g., at quarter inch intervals, or may be configured for continuous fine tuning, e.g., using a threaded design. In one example, the adjustable length is provided via selectively attachable segments to the length of the steer bar 101. In another example, the steer bar 101 may include one or more telescoping segments may be provided between the ends 102, 104 that may be rotated to lock and release sliding movement of segments to enable extension or retraction of available length of the segments. In an example of a continuous fine tuning adjustable a length one or more threaded connections may be provided between the ends 102, 104 such that an end 102, 104 may be rotated along the threaded connection relative to another portion of the steer bar 101 to increase or decrease the operative length of the steer bar 101.

In one example, a telescoping segmented configuration may be provided for continuous fine tuning wherein on or more telescoping segments include threads to allow rotation thereof to increase or decrease an exposed length of the segment. In any of the above examples, configurations may include detents such as pins or push buttons to lock and unlock extension and retraction operations.

In various embodiments, the steering lock 100 may be modular such that it may be coupled to the towed bracket 50 when its use is desired and uncoupled when its use is not desired. In one variation, the steering lock 100 may be fixed to the towed bracket 50 such that its removal is not practical or is time consuming. In one embodiment, the steering lock 100 may be configured to be mounted to the towed cart such that the steering lock 100 is retained on the cart between towing operations and coupled to the towed bracket 50 or other mounting point for locking the steering during tow operations.

In some embodiments, the tow bracket 20, towed bracket 50, or both include one or more supports 34, 64. Supports 34, 64 may be used to reinforce the structure of the body 22, 62 to provide additional strength during towing operations. Supports 34, 64 may relieve structural stress along one or more portions of the bracket 20, which may include distributing structural stresses along the body 22, 52 from the bar coupling 30, 60 or increasing its structural connection to the body 22, 52.

In some embodiments, the tow bracket 20, towed bracket 50, or both include one or more stabilizers 36a, 36b, 66a, 56b. Stabilizers 36a, 36b, 66a, 66b may be used to stabilize a position of the bracket 20, 50 when coupled to a tow hitch 120. In some examples, stabilizers 36a, 36b, 66a, 66b may also relieve structural stress from one or more portions of the bracket 20, 50 or cart, which may include distributing structural stresses, due to directional forces applied to the bracket 20, 50 between the cart and bar link 80. Vertical stabilizers 36a, 66a, lateral stabilizers 36b, 66b or both may be configured to relieve structural stress at the hitch mount 24, tow hitch 120, or both by limiting vertical or lateral structural stresses applied to the hitch mount 24, tow hitch 120, or both by distributing vertical or lateral forces along the axle or frame of the cart while maintaining the position of the bracket 20, 50. For example, one or more vertical stabilizers 36a, 66a may be provided to stabilize the vertical angular position of the bracket 20, 50 when coupled to the tow hitch 120. Vertical stabilizers 36a, 66a may be configured to position one or more of above, below, or within an axle or frame member, which may be any fixed structure with respect to the frame, of the cart when coupled to the bracket 20, 50. In an above or another example, lateral stabilizers 36b, 66b may be provided to stabilize a lateral angular position of the bracket 20, 50 when coupled to a tow hitch 120. Lateral stabilizers 36b, 66b may be configured to position one or more of in front of, behind, or along a side of an axle or frame member of the cart when coupled to the bracket 20, 50. Thus, the angular components of the position of the bracket 20, 50 when coupled to a tow hitch may be stabilized by one or more stabilizers 36a, 36b, 66a, 66b in order to prevent or limit angular movement of the bracket 20, 50 on the tow hitch.

FIGS. 2A-2D illustrate various views of an example tow bracket 20. The tow bracket 20 includes a body 22. A hitch mount 24 is positioned along the body 22 and is configured to couple to a tow hitch 120. The hitch mount 24 also includes a hitch slot 28 configured to receive the tow hitch 120 between upper and lower sides 24a, 24b of the hitch mount 24. The hitch slot 28 is also defined by lateral sides

24c, 24d of the hitch mount 24. The hitch mount 24 includes a hitch coupling 26 comprising upper and lower openings 26a, 26b configured to receive a coupling member 14, such as a pin. The upper opening 26a is defined by the upper side 24a of the hitch mount 24 and the lower opening 26b is defined by the lower side 24b of the hitch mount 24.

The tow bracket 20 also includes a bar link mount 30 configured couple to a first bracket end 82 of a bar link 80. The bar link mount 30 includes a link bracket 32 including an opening 31 for receiving a coupling member 14 comprising a pin that is extendable through an opening 81 in a first bracket end 82 of the bar link 80 to couple the bar link 80 to the tow bracket 20. Various link bracket 32 configurations may be employed. In the embodiment shown, the link bracket 32 includes coupling support structures that support coupling between the tow bracket 20 and bar link 80, e.g., via a coupling member 14. For example, the link bracket 32 includes two plates that define a channel 33 for receiving the first bracket end 82 of the bar link 80. When coupled to the tow bracket 20 within the channel 33, the bar link 80 is prevented from laterally pivoting relative to the tow bracket 20, and the bar link 80 may pivot vertically within the channel 33 about the coupling member 14. In another configuration, the link bracket 32 may include other bracket structures positioned along the body 22 for providing structural support to the bar link 80 while enabling vertical pivoting.

The illustrated tow bracket 20 also includes supports 34 that extend from the plates to provide structural support with respect to the position of the link bracket 32. The supports 34 may extend at various angles with respect to a major plane of the body 22 and the front of a cart when mounted thereon In FIGS. 2A-2C, the supports 34 extend below the body 22, perpendicular to a major plane of the body 22, and include portions that extend parallel and perpendicular relative to the front of the cart when mounted thereto. However, in some embodiments, supports 34 may extend from the body 22 at other angles. For example, in FIG. 2D, the supports 34 extend below the body 22, perpendicular to the major plane of the body 22, and include portions that extend parallel and at inwardly directed angles with respect to the front of a cart when mounted thereto.

The illustrated tow bracket 20 also includes a vertical stabilizer 36a. The vertical stabilizer 36a includes a plate that extends from the body 22 parallel to the major plane configured to position under a front axle 122 (see, e.g., FIG. 6) of a tow cart when the tow bracket 20 is coupled to a tow hitch 120. However, as some carts may include axles having lower surfaces that are positioned a greater vertical distance from a provided tow hitch 120, some embodiments may include vertical stabilizers 36a that are offset from the major plane of the body 22 to extend under the front axle 122 of the tow cart. The vertical stabilizer 36a may also be extendable into a custom slot in the front axle 122.

The tow bracket 20 also includes a lateral stabilizer 36b. The lateral stabilizer 36a includes a plate that extends vertically, approximately perpendicular, from the body 22. The lateral stabilizer 36b is configured to position approximately flush against the front axle 122 of a tow cart. The lateral stabilizer 36b is offset from the back of the hitch mount 24 along the rear of the body 22 to correspond to an extension of a tow hitch 120 from a front axle 122. However, as tow hitches 120 may be provided in different sizes, dimensions, and extensions from a front axle 122, lateral stabilizers 36b may be positioned at suitable locations to position along a front axle 122 and provide lateral support. As shown, the lateral stabilizer 36b is positioned on lateral sides of the hitch mount 24 and includes a vertically extending plate on each lateral side.

FIGS. 3A-3D illustrate various views of an example towed bracket 50. The towed bracket 50 includes a body 52 including a hitch mount 54 configured to couple to a tow hitch 120 of a towed cart. The hitch mount 54 includes a hitch slot 58 configured to receive the tow hitch 120 between upper and lower sides 54a, 54b and lateral sides 54c, 54d of the hitch mount 54. The hitch mount 54 includes a hitch coupling 56 comprising upper and lower openings 56a, 56b configured to receive a coupling member 14, such as a pin. The upper opening 56a is defined within the upper side 54a of the hitch mount 54 and the lower opening 56b is defined within the lower side 54b of the hitch mount 54.

The towed bracket 50 also includes a bar link mount 60 configured couple to a second bracket end 84 of a bar link 80. The bar link mount 60 includes a link bracket 62 including an opening 63 for receiving a coupling member 14 comprising a pin that is extendable through an opening 83 in the second bracket end 84 of the bar link 80 to couple the bar link 80 to the towed bracket 50. Various link bracket 62 configurations may be employed. In the embodiment shown, the link bracket 62 includes coupling support structures that support coupling between the tow bracket 50 and bar link 80, e.g., via a coupling member 14. For example, the link bracket 62 includes two plates that define a channel 63 for receiving the second bracket end 84 of the bar link 80. When coupled to the towed bracket 50 within the channel 63, the bar link 80 is prevented from laterally pivoting relative to the towed bracket 50, and the bar link 80 may pivot vertically within the channel 63 about the coupling member 14. In another configuration, the link bracket 62 may include other bracket structures positioned along the body 52 for providing structural support to the bar link 80 while enabling vertical pivoting.

The illustrated towed bracket 50 also includes supports 64 that extend from plates to provide structural support with respect to the position of the link bracket 62. The supports 64 may extend at various angles with respect to a major plane of the body 42 and the front of a cart when mounted thereon In FIGS. 3A-3C, the supports 64 extend below the body 52, perpendicular to a major plane of the body 52, and include portions that extend parallel and perpendicular relative to the front of the cart when mounted thereto. However, in some embodiments, supports 64 may extend from the body 52 at other angles. For example, in FIG. 3D, the supports 64 extend below the body 52, perpendicular to the major plane of the body 52, and include portions that extend parallel and at inwardly directed angles with respect to the front of a cart when mounted thereto.

The illustrated towed bracket 50 also includes a vertical stabilizer 66a. The vertical stabilizer 66a includes a plate that extends from the body 52 and is configured to position under a front axle 122 of a towed cart when the tow bracket 20 is coupled to a tow hitch 120. The vertical stabilizer 66a extends approximately along the major plane of the body 52. However, as some carts may include axles having lower surfaces that are positioned a greater vertical distance from a provided tow hitch 120, some embodiments may include vertical stabilizers 66a that are offset from the major plane of the body 62 to extend under the front axle 122 of the towed cart. The vertical stabilizer 66a may also be extendable into a custom slot in the front axle 122.

The towed bracket 50 also includes a lateral stabilizer 66b. The lateral stabilizer 66a includes a plate that extends vertically, approximately perpendicular, from the body 52. The lateral stabilizer 66b is positioned to position approximately flush against the front axle 122 of the towed cart. The lateral stabilizer 66b is offset from the back of the hitch mount 54 along the rear of the body 52 to correspond to an extension of a tow hitch 120 from a front axle 122. However, as tow hitches 120 may be provided in different sizes, dimensions, and extensions from a front axle 122, lateral stabilizers 66b may be positioned at suitable locations to position along a front axle 122 and provide lateral support. As shown, the lateral stabilizer 66b is positioned on lateral sides of the hitch mount 54 and includes a vertically extending plate on each lateral side.

The illustrated towed bracket 50 also includes a steering lock mount 72 configured to couple to a steering lock mount coupling 103 of a steering lock 100. The steering lock mount 72 includes a steering lock coupling 73 comprising a mounting shaft onto which the steering lock mount coupling 103 mounts. The steering lock coupling 73 and steering lock mount coupling 103 may comprise complementary cross-section dimensions such that the steering lock coupling 73 may be received within the steering lock mount coupling 103. The complementary cross-section dimensions may comprise any suitable cross-section shape, such as circular, oblong, polygon, or otherwise. In the illustrated example, the steering lock coupling 73 comprises a circular cross-section shape configured to be received by a steering lock mount coupling 103 having a complementary circular cross-section shape and dimension. In one such example, the steering lock mount coupling 103 is configured to pivotably mount onto the steering lock coupling 73 for ease of positioning the steering control link coupling 105 at the second end of the steer bar 101 relative to the steering control link 126 provided on a towed cart when coupling to the same.

The steering lock mount 72 also includes a riser 74 configured to raise the position the steering lock coupling 73. A shoulder 74 is also provided along the upper end of the riser 74. In some embodiments, a steering lock mount coupling 103 may extend around the steering lock coupling 73 and seat on the shoulder 75. For instance, in one example, the steering lock mount coupling 103 comprises a bushing configured to receive the steering lock coupling 73 and a lower end of the bushing seats along the shoulder 75. In another example, the steering lock mount coupling 103 comprises a bushing having a closed end that does not seat along the shoulder 75 or the steering lock mount 72 is provided without a riser 74, shoulder 75, or both.

In various embodiments, bracket assemblies 12 may include a towed bracket 50 having a similar configuration to the tow bracket 20 with respect to one or more of features, such as body 22, 52, hitch mount 24, 54, bar link coupling 30, 60, or, when included, one or more supports 34, 64, or one or more stabilizers 36a, 36b, 66a, 66b. For example, the towed bracket 50 shown in FIGS. 3A-3D includes a similar configuration as the tow bracket 20 shown in FIGS. 2A-2D with respect to similar features. However, in other embodiments, a towed bracket 50 and a tow bracket 20 may comprise different configurations in these or other features. For example, hitch mounts 24, 54 may be configured differently to mount to different types of tow hitches or similar types of two hitches. Additionally or alternatively, bar link couplings 30, 60 may be configured differently to couple to similar or different ends of a bar link 80. In one embodiment, one or both of the towed bracket 50 or tow bracket 20 includes one or more supports 34, 64, or one or more stabilizers 36a, 36b, 66a, 66b. In a further example, the towed bracket 50 includes a stabilizer 66a, 66b and the tow bracket 20 does not. In an example including one or more supports 34, 64, or one or more stabilizers 36a, 36b, 66a, 66b, the tow bracket 20 may include one or more supports 34 or one or more stabilizers 36a, 36b having a different configuration than one or more supports 64 or one or more stabilizers 66a, 66b of the towed bracket 50 or the towed bracket 50 may not include a support 64 or a stabilizer 66a, 66b.

Figure 4A:
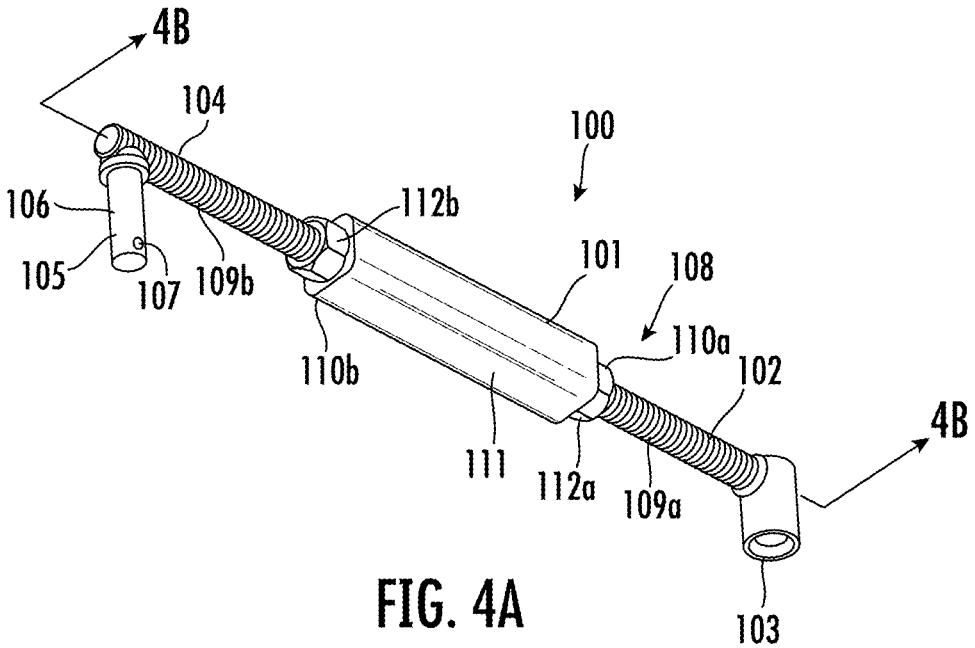
Figure 4B:
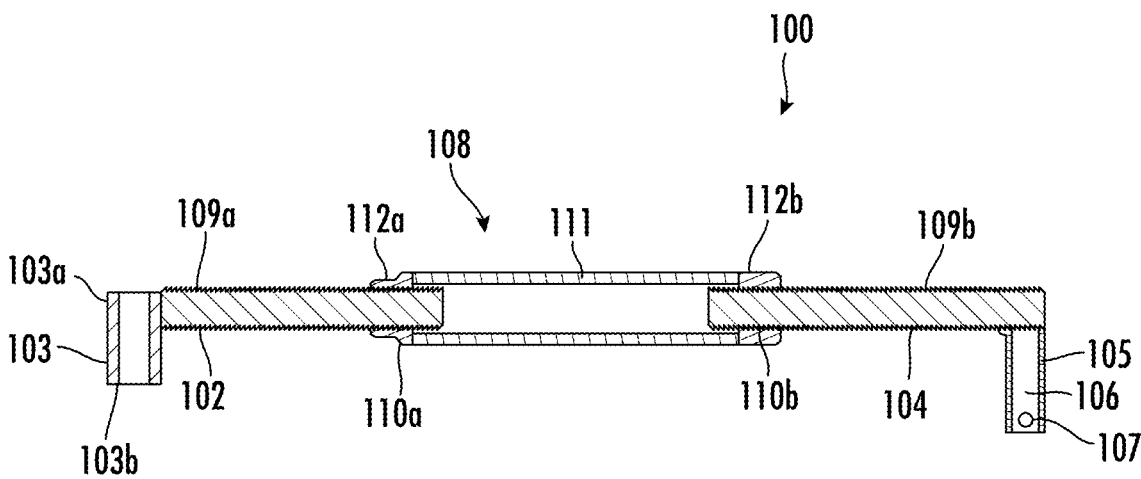

FIGS. 4A and 4B illustrate a perspective and partial cross-section view of a steering lock 100 according to various embodiments. The steering lock 100 may be configured to couple between a steering lock mount 72 of a towed bracket 50 and a steering control link 126 of a towed cart to lock the direction of the front wheels of the cart in a desired direction. The steering lock 100 includes a steer bar 101 comprising a first end 102 and a second end 104. The first end 102 is configured with a steering lock mount coupling 103 configured couple to a steering lock mount 72 at a steering lock coupling 73. The steering mount coupling 103 includes a bushing configured to receive the steering lock coupling 73. In the illustrated embodiment, the bushing includes two open ends 103a, 103b through which the steering lock coupling 73 may be received. As noted elsewhere herein, the steering lock mount 72 may include a shoulder 75, e.g., a flange or other physical stop, that the lower open end 103b may seat when slipped over the shaft of the steering lock coupling 73.

The second end 104 comprises a steering control link coupling 105 configured to couple to a steering control link 126 provided on the towed cart. The steering control link coupling 105 includes a shaft 106 configured to be received within a slot provided by the steering control link 126. The shaft 106 comprises a clevis pin that extends from the second end 104 of the steer bar 101. A channel 107 for receiving a pin, such as a cotter pin, is provided at an end of the shaft 106 for securing the shaft 106 within the slot of the steering control link 126 when extended therethrough.

The steer bar 101 is configured with a selectively adjustable length. The adjustable length may enable customization of the locking direction of the wheels by controlling a distance between the steering lock mount coupling 103 and the steering control link coupling 105. The adjustable length is configured for continuous fine tuning to provide any desired length of the available length of the steer bar 101. The steer bar 101 is provided with a turnbuckle assembly 108 wherein the first end 102 includes a threaded shaft 109a that threadably connects to a first side 110a of a coupling 111 and the second end 104 includes a threaded shaft 109b that threadably connects to a second side 110b of the coupling 111. The coupling 111 includes an adjustment mechanism comprising threaded connections 112a, 112b, depicted as hex nuts, positioned at first and second sides 110a, 110b that enable adjusting the length of the exposed ends 102, 104 by rotating the threaded connections 112a, 112b relative to the threaded shafts 109a, 109b. The threaded shaft 109a at the first end 102 comprises right hand threads and the threaded connection 112a at the first side 110a of the coupling 111 comprises right hand threads. The threaded shaft 109b at the second end 104 comprises left hand threads and the threaded connection 112a at the second side 110b of the coupling 111 comprises left hand threads. Rotating the threaded connections 112a, 112b or coupling 111 relative to the threaded shafts 109a, 109b changes the exposed length of the threaded shafts 109a, 109b from the coupling 111. In another embodiment, one or both of the threaded connections 112a, 112b may comprise rotatable nuts that may be rotatable relative to the coupling 111 and threaded shaft 109a, 109b to enable adjustment of the exposed length of the threaded shaft 109a, 109b independent of the other threaded shaft 109a, 109b.

While the illustrated embodiment depicts a steering control link coupling 105 comprising a shaft for coupling to a steering control link 126, e.g., through a slot, in other embodiments other configurations of steering control link couplings 105 may be used. For example, clamps, threaded connections, quick connects, or other couplings may be used. In instances when the steering control link 126 is equipped with a different coupling structure, the steering control link coupling 105 may be equipped with a suitable coupling structure for coupling to the steering control link 126. For example, a steering control link 126 may include a coupling structure comprising a shaft. Accordingly, the steering control link coupling 105 may comprise a slot configured to receive the shaft and thereby couple to the steering control link 126. In one embodiment, the steering lock 100 is provided with a plurality of steering control link coupling 105 configurations that may be selectively interchanged to suit the coupling structure of the steering control link 126 available on carts. For instance, in an example wherein a cart is equipped with a steering control link 126 comprising a shaft, a second end 104 or steering control link coupling 105 comprising a coupling structure incompatible with mounting to the shaft may be released from the steer bar 101, e.g., via rotating to release threaded engagement, and be selectively replaced by another second end 104 or steering control link coupling 105 comprising a slot configured to receive the shaft of the steering control link 126. In some embodiments, the first end 102 or steering lock mount coupling 103 may additionally or alternatively be selectively interchangeable with other configurations of steering lock mount coupling 103 or first ends 102 including other configurations of steering lock mount couplings 103 to enable modification of the steer link 101 for compatible use with steering lock mounts 72 having different configurations. Thus, different configurations of steering lock mounts 72, steering lock mount couplings 103, or steering control link couplings 105 may be used and, in some embodiments, the steering lock 100 may be provided with selectively interchangeable steering lock mount couplings 103, steering control link couplings 105, or both to provide increased compatibility with different coupling structures provided by steering lock mounts 72 or steering control links 126.

Figure 5:
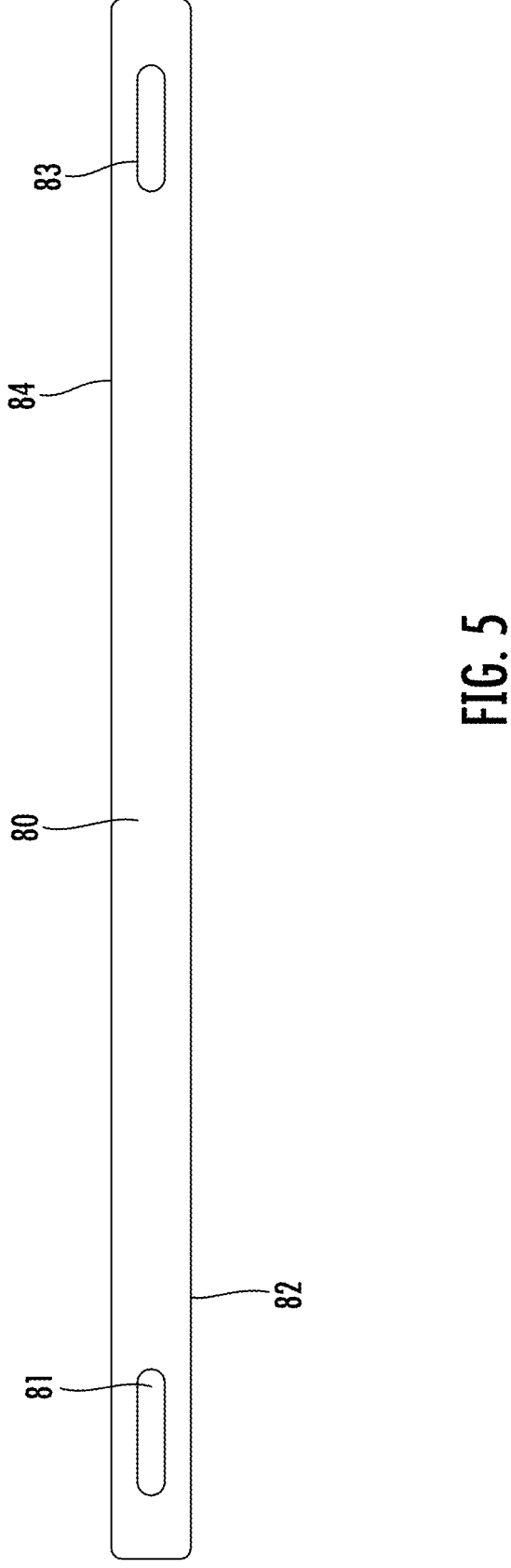
FIG. 5 illustrates a bar link of a tow link according to various embodiments described herein.

FIG. 5 illustrates an example bar link 80 configured to couple a tow bracket 20 and towed bracket 50. The bar link 80 includes a first bracket end 82 configured to couple to a bar link mount 30 of a tow bracket 20 and a second bracket end 84 configured to couple to a bar link mount 60 of a towed bracket 50. Openings 81, 83 through the bar link 80 are provided at respective tow bracket and second bracket ends 82, 84 for receiving a coupling member 14, such as a pin, to secure the bar link 80 to the brackets 20, 50, an example of which is shown in FIG. 6. In various embodiments, the coupling mechanism employed by one or both of the bar link mounts 30, 60 and respective first bracket end 82 and second bracket end 84 is a pivotable connection. The pivot may be vertical, horizontal, or universal, for example. In the illustrated example, the pivot is vertical about the coupling member 14.

Figure 3A:
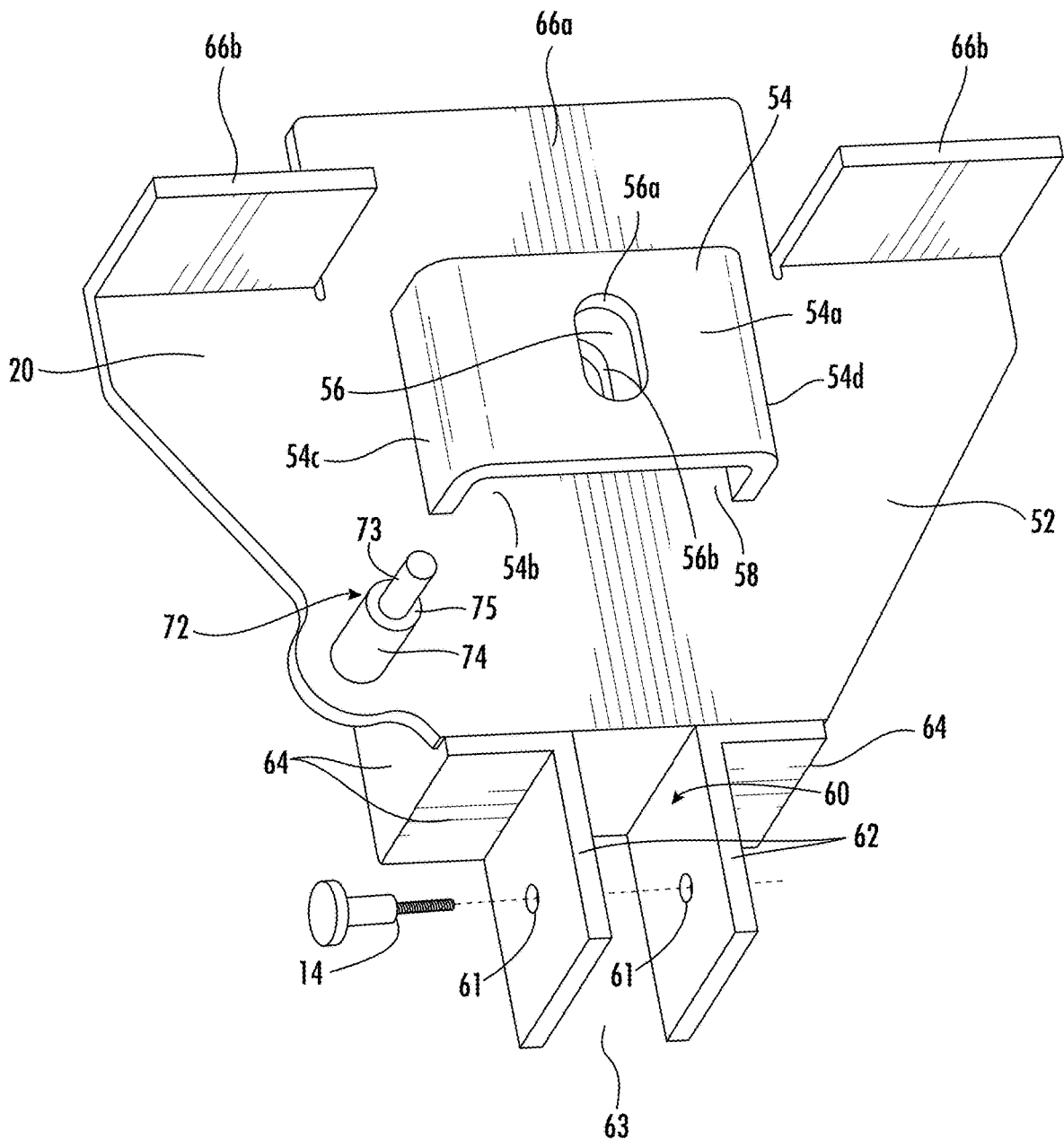
Figure 3B:
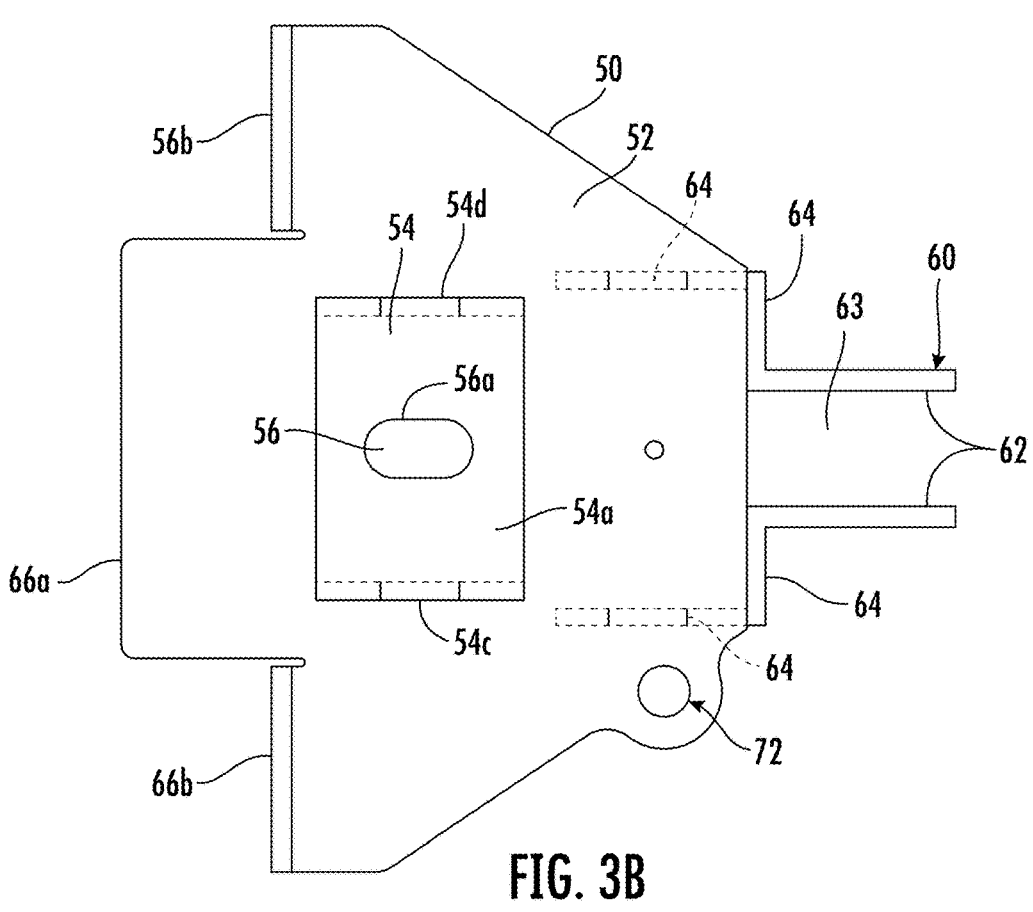
Figure 3C:
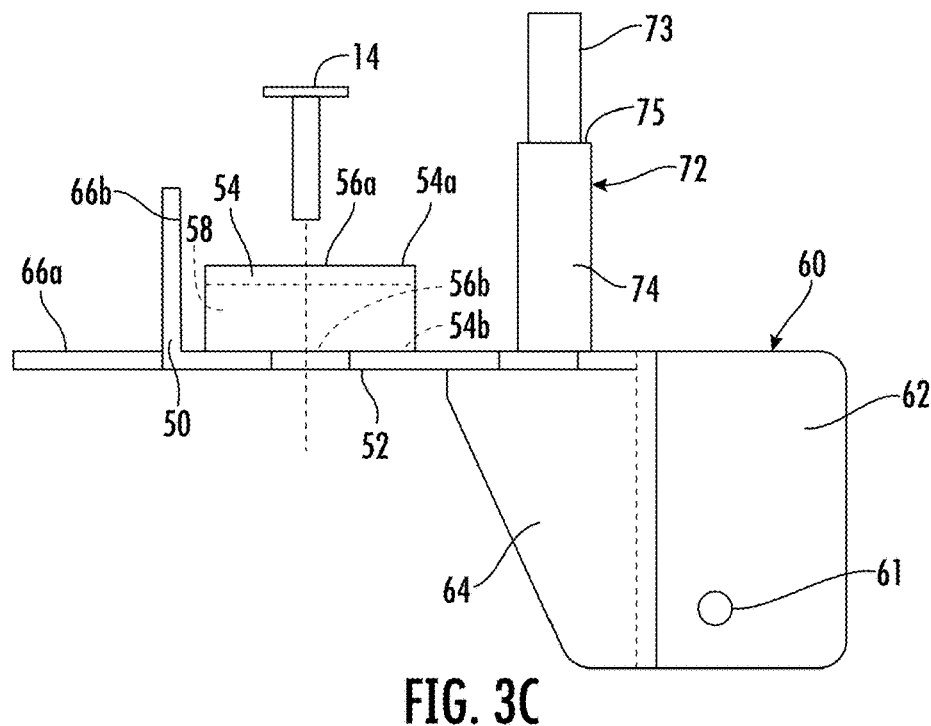
Figure 3D:
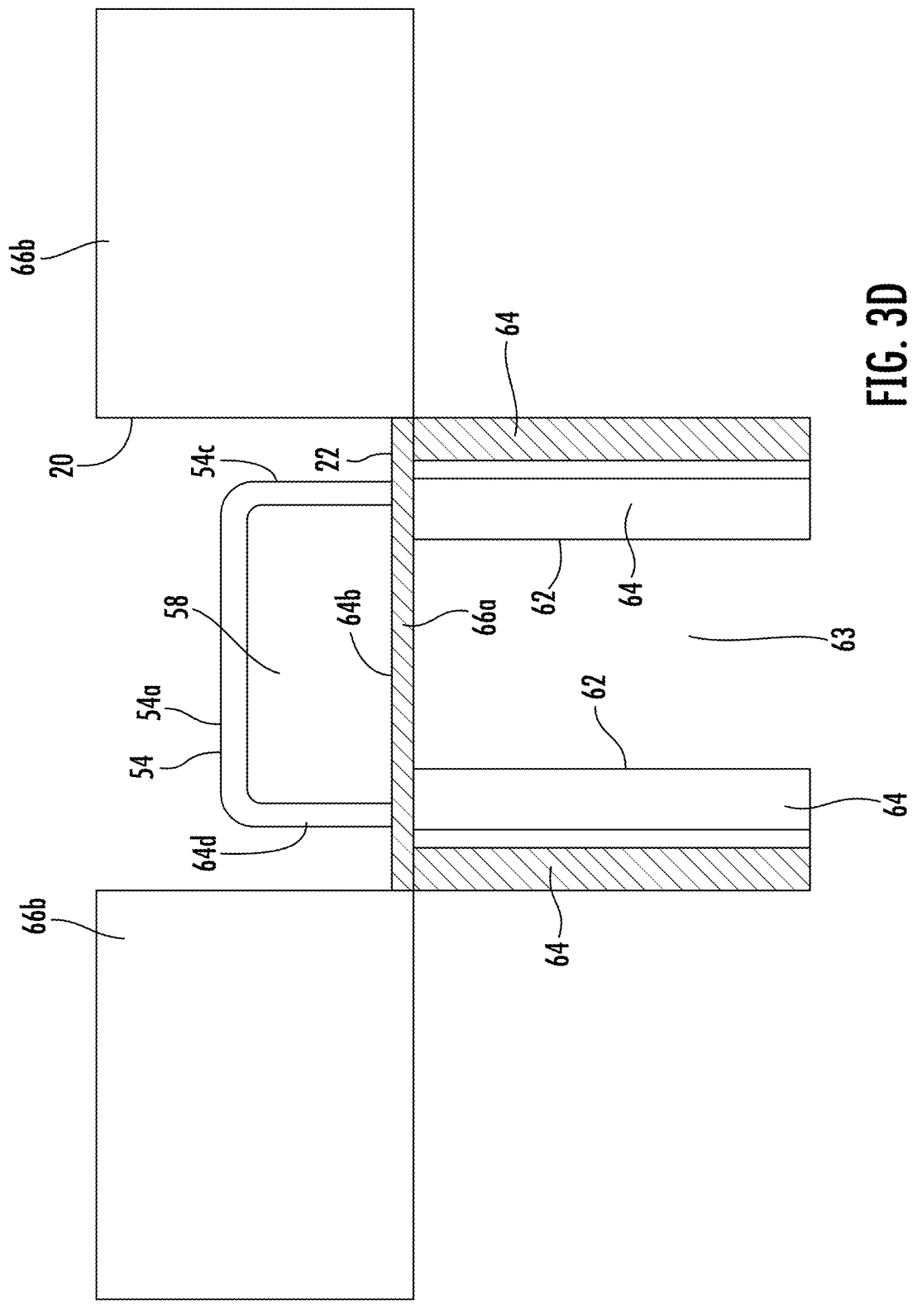

FIG. 6 depicts an example coupling of the towed bracket 50 shown in FIGS. 3A-3C coupled to the steering lock 100 shown in FIGS. 4A and 4B, wherein the steering lock mount coupling 103 is coupled to the steering lock mount 72. The towed bracket 50 is further shown coupled with a tow hitch 120 (shown in partial ghost) attached to a front axle 122 of a towed cart 124. The tow hitch 120 is inserted within the hitch slot 58 and a coupling member 14 comprising a pin is inserted through the upper and lower openings 56a, 56b of the hitch coupling 56 as well as through the opening (not visible) of the tow hitch 120. The steering control link coupling 105 of the steering lock 100 is further shown coupled to a steering control link 126 of the towed cart 124 to lock the position of the wheel 128 relative to the towed bracket 50. The bar coupling 60 of the towed bracket 50 is also shown coupled to the second bracket end 84 of a bar link 80 via a coupling member 14 comprising a pin. The pin comprises a clevis pin and a cotter pin 114 is shown extending through a channel in the clevis pin to secure the coupling member 14 within the bar coupling 60. In some embodiments, the coupling member 14 used to retain the tow hitch 120 to the hitch mount 56 may include a clevis pin having a channel to similarly receive a cotter pin 114 or similar to secure the coupling member 14 extended through the opening of the tow hitch 120 within the upper and lower openings 56a, 56b of the hitch coupling 56.

The tow link 10 may comprise various dimensions suitable for mounting between a tow and towed cart to perform the tow operations described herein. In one example, a hitch slot 28, 58 comprises a vertical distance of about 0.8 inches and a horizontal distance of about 2.8 inches. In one embodiment including one or more stabilizers 36a, 36b, 66a, 66b, the stabilizers 36a, 36b, 66a, 66b may extend any suitable distance from the body 22, 52 of the bracket 20, 50. In one example, one or more stabilizers 36a, 36b, 66a, 66b extend a greater distance from the body 22, 52 than the upper side 24a, 54a of the hitch mount 24, 54. In this or another example, a vertical stabilizer 36a, 66a, lateral stabilizer 36b, 66b, or both may extend about 0.5 inches or more, e.g., between 0.5 and 5 inches, from the body 22, 52. In one example, a vertical stabilizer 36a, 66a extends about 1.4 inches from the body 22, 52, a lateral stabilizer 36b, 66b extends above 1.8 inches from the body 22, 52, or combination thereof. In embodiments comprising one or more supports 34, 64, supports 34, 64 may extend any suitable distance along the body 22, 52. For instance, supports 34, 64 may extend a distance of about 0.25 inches or more along the body 22, 52, such as between about 0.5 inches and about 3 inches. As an example, supports 34, 64 may extend approximately 2 inches along the underside of the body 22, 52. As noted above, the tow bracket 20 and towed bracket 50 may comprise different configurations and need not include the same features or dimensions. Steering lock mounts 72 may be provided in suitable dimensions for coupling to the steering lock 100 at the steering lock mount coupling 103. For example, the steering lock coupling 73 may include a height dimension that approximately corresponds to that of the steering lock mount coupling 103. In one example, the steering lock coupling 73 extends 0.5 inches or more in height, such as between 1.0 inch and 3 inches or greater. In embodiments comprising a riser 74, the riser 74 may extend a height suitable for coupling the steer bar 101 to the steering control link 126. In one example, the riser 74 extends about 2 inches from the upper side of the body 52. In a further example, the riser 74 extends about 2 inches from the upper side of the body 52 and the steering lock coupling 73 comprises a mounting shaft that extends an additional 1.0 incher or more, such as about 1.5 inches more. Various lengths of link bars 80 may be provided. For example, in one embodiment, a link bar 80 may be between 20 inches and 22 inches. Longer or shorter link bars 80 may be used. Link bar openings 81, 83 may be provided in various dimensions. In various embodiments, link bar openings 81, 83 may include a longer longitudinal length dimension than width dimension. In one example, the width dimension corresponds approximately to the width dimension of the coupling member 14, such that the coupling member 14 may extend therethrough to allow vertical pivoting, and the length dimension is 2 to 6 times larger. In one configuration, the width of the opening is about 0.35 inches, and the length is about 1.65 inches.

A method of linking a tow cart and a towed cart using the tow link 10 may include positioning the tow cart in front of the towed cart, facing each other, at a distance corresponding approximately to the length of the bar link 80. The tow bracket 20 may be coupled to the tow hitch 120 of the tow cart by positioning the tow hitch 120 within the to hitch slot 28 of the hitch mount 24 and inserting a coupling member 14 through the mounting slots 26a, 26b of the hitch coupling 26 and the slot of the tow hitch 120. The towed bracket 50 may be coupled to the tow hitch 120 of the towed cart by positioning the tow hitch 120 within the to hitch slot 58 of the hitch mount 54 and inserting a coupling member 14 through the mounting slots 56a, 56b of the hitch coupling 56 and the slot of the tow hitch 120. The bar link 80 may be coupled to the tow bracket 20 at the first bracket end 82 via the bar coupling 30. For instance, the first bracket end 82 may be positioned within a channel 33 defined by the link bracket 36 and a pin or other suitable coupling member 14 may be inserted through openings 31, 81. The bar link 80 may be coupled to the towed bracket 50 at the second bracket end 84 via the bar coupling 60. For instance, the second bracket end 84 may be positioned within a channel defined by the link bracket 62 and a pin or other suitable coupling member 14 may be inserted through openings 61, 83. In one example, cotter pins 114 may be passed through channels in the pins to prevent the pins from being removed during towing operations. If a steering lock 100 is being used, the wheels of the towed cart may be set to the desired lock position, e.g., aligned with the wheels of the tow cart, and the steering lock 100 may be coupled between the towed bracket 50 and the steering control link 126. For example, the steering lock mount coupling 103 at the first end 102 of the steer bar 101 may be coupled to the steering lock coupling 72 of the steering lock mount 72. For instance, the steering lock mount coupling 103 may comprise a bushing and the steering lock mount coupling 72 may comprise a shaft that the steering lock coupling 103 receives. In a further configuration, the steering lock mount coupling 103 may be slid along the shaft to a shoulder 75. The shoulder 75 may comprise an upper end of a riser 74. The steering control link coupling 105 at the second end 104 of the steer bar 101 may be coupled to the steering control link 126. For example, the steering control link coupling 105 may comprise a shaft that inserts into a slot provided by the steering control link 126. In one example, a cotter pin 114 or other retaining structure may be passed through a channel in couplings or otherwise to prevent decoupling during towing operations. In one example, the length of the steer bar 101 may be adjusted to fine tune the wheel alignment of the towed cart by rotating a threaded connection 112a, 112b relative to one or more threaded shafts 109a, 109b extending along the first or second ends 102, 104 of the steer bar 101. The method may include releasing a brake lock of the towed cart, when so equipped and set. With the tow cart and the towed cart linked by the tow link 10, push/pull tow operations may be performed. For example, if retrieving a towed cart that is backed into a storage bay, the tow cart may be put into reverse to pull the towed cart from the storage bay. For instance, the tow cart may be put into reverse and backed straight away from the storage bay until the towed cart is fully removed and all four wheels are on the ground outside of the trailer. When the towed cart is in the desired position, the brake on the towed cart may be set and the bar link 80 and towed cart bracket 50. If delivering a towed cart into a storage bay such that it faces the storage bay entrance, the tow cart may be put into forward and the towed cart may be pushed into the storage bay from the entrance. If additional carts are to be delivered or retrieved from the storage bay, the tow bracket 20 may be left on the tow cart and the towed bracket 50 and the bar link 80 may be coupled to the next cart.

The present disclosure describes various elements, features, aspects, and advantages of various embodiments of tow link 10. It is to be understood that certain descriptions of the various embodiments have been simplified to illustrate only those elements, features and aspects that are relevant to a clearer understanding of the disclosed embodiments, while eliminating, for purposes of brevity or clarity, other elements, features and aspects. It is to be understood that while this description may use directional or relative positional language, the features and components thereof may be used in multiple orientations, and such directional or relative positional language has been used to assist the reader in understanding the features and operations of the invention described herein and is not intended to be limiting.

The illustrations of arrangements described herein are intended to provide a general understanding of the structure of various embodiments, and they are not intended to serve as a complete description of all the elements and features that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

Any references to "various embodiments," "certain embodiments," "some embodiments," "one embodiment," "an embodiment," or their "example," "configuration, or "instance" counterparts generally means that a particular element, feature and/or aspect described is included in at least one embodiment but may not refer to the same embodiment. Furthermore, the phrases "in one such embodiment" or "in certain such embodiments," while generally referring to and elaborating upon a preceding embodiment, are not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

What is claimed is:

1. A golf cart tow link for linking a tow cart and a towed cart, the tow link comprising:
   a tow bracket comprising a body configured to couple to a front tow hitch of a tow cart;
   a towed bracket comprising a body configured to couple to a front tow hitch of a towed cart in a fixed position relative to the towed cart;
   a bar link having a tow bracket end configured to couple to a bar coupling of the tow bracket and a towed bracket end configured to couple to a bar coupling of the towed bracket; and
   a steering lock comprising a steer bar having a first end configured to couple to the towed bracket and a second end configured to couple to a steering control link of the towed cart to lock a front wheel orientation of the towed cart relative to the towed bracket;
   wherein the tow bracket, towed bracket, or both include a lateral stabilizer configured to stabilize a lateral angular position of the respective tow bracket or towed bracket when coupled to the front tow hitch of the respective tow cart or towed cart and that is further configured to position flush against a front axle of the respective tow cart or towed cart when coupled to the front tow hitch thereof.

2. The tow link of claim 1, wherein the lateral stabilizer includes one of more plates that extend parallel to a major plane of the body.

3. A golf cart tow link for linking a tow cart and a towed cart, the tow link comprising:
   a tow bracket comprising a body configured to couple to a front tow hitch of a tow cart;
   a towed bracket comprising a body configured to couple to a front tow hitch of a towed cart;

a bar link having a tow bracket end configured to couple to a bar coupling of the tow bracket and a towed bracket end configured to couple to a bar coupling of the towed bracket; and a steering lock comprising a steer bar having a first end configured to couple to the towed bracket and a second end configured to couple to a steering control link of the towed cart to lock a front wheel orientation of the towed cart relative to the towed bracket, wherein the body of the tow bracket includes a hitch mount comprising:

a hitch slot having an upper side and a lower side and configured to receive the front tow hitch of the tow cart therein; and a hitch coupling comprising an opening for receiving a coupling member that further extends through an opening in the front tow hitch of the tow cart to couple the hitch mount and front tow hitch of the tow cart, wherein the hitch slot includes an upper side and a lower side, and wherein the opening comprises an opening in the upper side and an opening in the lower side.

4. A golf cart tow link for linking a tow cart and a towed cart, the tow link comprising:

a tow bracket comprising a body configured to couple to a front tow hitch of a tow cart;

a towed bracket comprising a body configured to couple to a front tow hitch of a towed cart;

a bar link having a tow bracket end configured to couple to a bar coupling of the tow bracket and a towed bracket end configured to couple to a bar coupling of the towed bracket; and a steering lock comprising a steer bar having a first end configured to couple to the towed bracket and a second end configured to couple to a steering control link of the towed cart to lock a front wheel orientation of the towed cart relative to the towed bracket, wherein the tow bracket, towed bracket, or both include a vertical stabilizer configured to extend below a front axle of the respective tow cart or towed cart to stabilize a vertical position of the respective tow bracket or towed bracket when coupled to the front tow hitch of the respective tow cart or towed cart.

5. The tow link of claim 4, wherein the vertical stabilizer comprises one of more plates that extend parallel to a major plane of the body of the respective tow bracket or towed bracket.

6. A golf cart tow link for linking a tow cart and a towed cart, the tow link comprising:

a tow bracket comprising a body configured to couple to a front tow hitch of a tow cart;

a towed bracket comprising a body configured to couple to a front tow hitch of a towed cart;

a bar link having a tow bracket end configured to couple to a bar coupling of the tow bracket and a towed bracket end configured to couple to a bar coupling of the towed bracket; and a steering lock comprising a steer bar having a first end configured to couple to the towed bracket and a second end configured to couple to a steering control link of the towed cart to lock a front wheel orientation of the towed cart relative to the towed bracket, wherein the towed bracket includes a steering lock mount including a steering lock coupling configured to couple to a steering lock mount coupling positioned along the first end of the steer bar to couple the steering lock mount to the first end of the steer bar, wherein the steering lock mount coupling comprises a bushing that slidably mounts around the steering lock coupling to couple thereto, and wherein the steering lock coupling includes a shaft.

7. The tow link of claim 6, wherein the bushing has upper and lower ends that slidably mount over the shaft such that an upper end of the shaft extends beyond first and second ends of the bushing.

8. The tow link of claim 7, wherein the steering lock mount extends vertically upwards from the body of the towed bracket from a riser to the steering lock mount coupling, wherein the steering lock mount includes a shoulder between the riser and the steering lock mount coupling, and wherein a lower end of the bushing seats on the shoulder when mounted on the steering lock coupling.

9. A golf cart tow link for linking a tow cart and a towed cart, the tow link comprising:

a tow bracket comprising a body configured to couple to a front tow hitch of a tow cart in a fixed position relative to the tow cart;

a towed bracket comprising a body configured to couple to a front tow hitch of a towed cart;

a bar link having a tow bracket end configured to couple to the tow bracket at a bar coupling of the tow bracket and a towed bracket end configured to couple to the towed bracket at a bar coupling of the towed bracket, wherein, when coupled to the bar coupling of the tow bracket, the tow end of the bar link is vertically pivotable and restrained from laterally pivoting relative to the tow bracket; and a steering lock comprising a steer bar having a first end configured to couple to the towed bracket and a second end configured to couple to a steering control link of the towed cart to lock a front wheel orientation of the towed cart relative to the towed bracket.

10. A golf cart tow link for linking a tow cart and a towed cart, the tow link comprising:

a tow bracket comprising a body configured to couple to a front tow hitch of a tow cart;

a towed bracket comprising a body configured to couple to a front tow hitch of a towed cart;

a bar link having a tow bracket end configured to couple to a bar coupling of the tow bracket and a towed bracket end configured to couple to a bar coupling of the towed bracket; and a steering lock comprising a steer bar having a first end configured to couple to the towed bracket and a second end configured to couple to a steering control link of the towed cart to lock a front wheel orientation of the towed cart relative to the towed bracket, wherein the bar coupling of the tow bracket, towed bracket or both comprises a link bracket comprising a first plate and a second plate that together define a channel for receiving the respective tow end or towed end of the bar link, wherein the first plate and second plate include openings configured to align with an opening in the respective tow end or towed end of the bar link when received within the channel and that receive a pin through the aligned openings to pivotably couple the respective tow end or towed end of the bar link.

11. The tow link of claim 10, wherein, when pivotably coupled, the respective tow end or towed end of the bar link is vertically pivotable on the pin and laterally restrained between the first and second plates.

12. A modular tow link for linking a tow cart and a towed cart, the modular tow link comprising:

a bracket assembly including a tow bracket configured to pivotably couple to a tow bracket end of a bar link about a horizontally extending pin and thereon be vertically pivotable and laterally restrained, and a towed bracket configured to pivotably couple to a tow bracket end of a bar link about a horizontally extending pin and thereon be vertically pivotable and laterally restrained, wherein when the bar link is coupled between the tow bracket and towed bracket, the bracket assembly is in a laterally fixed orientation; and a steering lock comprising a steer bar having a first end and a second end and configured to couple between the towed bracket and a steering control link of the towed cart in a fixed position therebetween to lock a front wheel orientation of the towed cart relative to the laterally fixed orientation of the of the bracket assembly.

13. The modular tow link of claim 12, wherein the tow bracket and towed bracket are configured to couple to front tow hitches of the respective tow cart and towed cart.

*    *    *    *    *